United States Patent
Yuba et al.

(10) Patent No.: US 7,495,656 B2
(45) Date of Patent: Feb. 24, 2009

(54) ACTUATOR THAT PROVIDES TACTILE INFORMATION

(75) Inventors: Takashi Yuba, Shinagawa (JP); Nobuyoshi Shimizu, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 13 days.

(21) Appl. No.: 11/498,040

(22) Filed: Aug. 3, 2006

(65) Prior Publication Data

US 2006/0267448 A1 Nov. 30, 2006

(30) Foreign Application Priority Data

Aug. 4, 2005 (JP) ............................. 2005-226849

(51) Int. Cl.
*G05G 9/047* (2006.01)
*H01H 35/02* (2006.01)
(52) U.S. Cl. .................. 345/163; 345/161; 74/471 XY
(58) Field of Classification Search ................ 345/160, 345/161, 163, 167; 310/154.02, 154.33, 310/156.37, 154.36, 140; 341/32; 74/471 XY
See application file for complete search history.

(56) References Cited

U.S. PATENT DOCUMENTS

| | | | | | |
|---|---|---|---|---|---|
| 3,768,095 | A | * | 10/1973 | Lins et al. ..................... | 341/32 |
| 4,197,488 | A | * | 4/1980 | Kant ........................... | 318/115 |
| 4,458,226 | A | * | 7/1984 | Cho ............................ | 335/205 |
| 4,459,578 | A | * | 7/1984 | Sava et al. ................... | 338/128 |
| 4,879,556 | A | * | 11/1989 | Duimel ........................ | 341/20 |
| 5,146,566 | A | * | 9/1992 | Hollis et al. .................. | 710/73 |
| 5,687,080 | A | * | 11/1997 | Hoyt et al. .................... | 700/85 |
| 6,664,666 | B2 | * | 12/2003 | Corcoran ..................... | 310/12 |
| 6,731,025 | B2 | * | 5/2004 | Dawson et al. ................ | 310/12 |
| 7,411,521 | B2 | * | 8/2008 | Lewis et al. ................... | 341/32 |
| 2005/0077165 | A1 | * | 4/2005 | Akieda et al. ............... | 200/520 |

FOREIGN PATENT DOCUMENTS

| | | |
|---|---|---|
| JP | 10026138 | 1/1998 |
| JP | 2000014117 | 1/2000 |
| JP | 2000037065 | 2/2000 |
| JP | 2000330688 | 11/2000 |
| JP | 2004145748 | 5/2004 |

* cited by examiner

*Primary Examiner*—Burton Mullins
(74) *Attorney, Agent, or Firm*—Staas & Halsey LLP

(57) ABSTRACT

An actuator that provides tactile information includes a stator formed in a plane plate, a translationally movable element disposed to oppose each other on one of main surfaces of the stator to move translationally in response to an electromagnetic power exerted between the translationally movable element and the stator in a first direction and in a second direction crossed at right angles to each other along the main surfaces, and a rotationally movable element disposed to oppose each other on the other main surface of the stator to move rotationally in response to the electromagnetic power exerted between the rotationally movable element and the stator.

5 Claims, 9 Drawing Sheets

ACTUATOR THAT PROVIDES TACTILE INFORMATION

BACKGROUND OF THE INVENTION

1. Field of the Invention

This invention generally relates to an actuator that provides a user with tactile information such as vibration or the like.

2. Description of the Related Art

In various electronics information devices that include computer devices, mobile information devices, and the like, there is known a technique of giving information to an operator with the use of an actuator that provides tactile or haptic information such as vibration or the like. It is desirable that the actuator that provides the tactile information be downsized as much as possible, in consideration that such actuator is built in a device. As a downsized actuator that provides the tactile information, for example, there is known the actuator in which a movable element moves in a two-dimensional direction, as disclosed in Japanese Patent Application Publication No. 2000-330688 (hereinafter, referred to as Document 1) and Japanese Patent Application Publication No. 2004-145748 (hereinafter, referred to as Document 2). The actuator disclosed in Document 1 includes: a stator of a plane plate provided with multiple magnets formed in a plane shape and disposed on a substrate; and a sensitive portion serving as a movable element that retains multiple coils commonly to oppose the magnets. The actuator is driven in a two-dimensional direction of x-axis direction and y-axis direction crossed at right angles at the sensitive portion, by making the current flow across the coils to control the coils. The actuator disclosed in Document 2 includes: a stator of a plane plate provided with multiple magnets formed in a plane shape and disposed on a substrate; a movable element that retains multiple coils commonly to oppose the stator; and a guide mechanism that movably guides the movable element in a two-dimensional direction of x-axis direction and y-axis direction.

It is to be noted that the above-described actuators have a structure in which the coils are disposed at only one side of the permanent magnets of a plane shape. Therefore, the use efficiency of the flux of the permanent magnets is low, and it is difficult to effectively increase the thrust force of the actuator. In addition, the above-described actuators just perform the translational movement in x-axis direction and in y-axis direction, thereby limiting the tactile information that can be provided to the above-described movement.

SUMMARY OF THE INVENTION

The present invention has been made in view of the above circumstances and provides an actuator that provides tactile information in which downsizing is realized and the thrust force is improved. More specifically, the present invention provides an actuator that can provide various kinds of tactile information in which downsizing is realized.

According to a first aspect of the present invention, preferably, there is provided an actuator that provides tactile information including: a stator formed in a plane plate; a translationally movable element disposed to oppose each other on one of main surfaces of the stator to move translationally in response to an electromagnetic power exerted between the translationally movable element and the stator in a first direction and in a second direction crossed at right angles to each other along the main surfaces; and a rotationally movable element disposed to oppose each other on the other main surface of the stator to move rotationally in response to the electromagnetic power exerted between the rotationally movable element and the stator. With the above-described configuration, the translationally movable element is provided on one of the main surfaces of a plane plate, and the rotationally movable element is provided on the other main surface, so that both sides of the stator are utilized. This realizes the downsized actuator and provides the tactile information in accordance with both the translational movement and the rotational movement of the movable elements.

According to a second aspect of the present invention, preferably, there is provided an actuator that provides tactile information including: a stator formed in a plane plate; and movable elements disposed to sandwich the stator to move in response to the electromagnetic power exerted in a first direction and in a second direction crossed at right angles to each other along main surfaces of the stator. With the above-described configuration, the downsized actuator can be realized and the thrust force exerted on the movable elements can be enhanced, by providing the movable elements of a plane plate to sandwich the stator.

BRIEF DESCRIPTION OF THE DRAWINGS

Preferred exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

First Exemplary Embodiment

Figure 1:
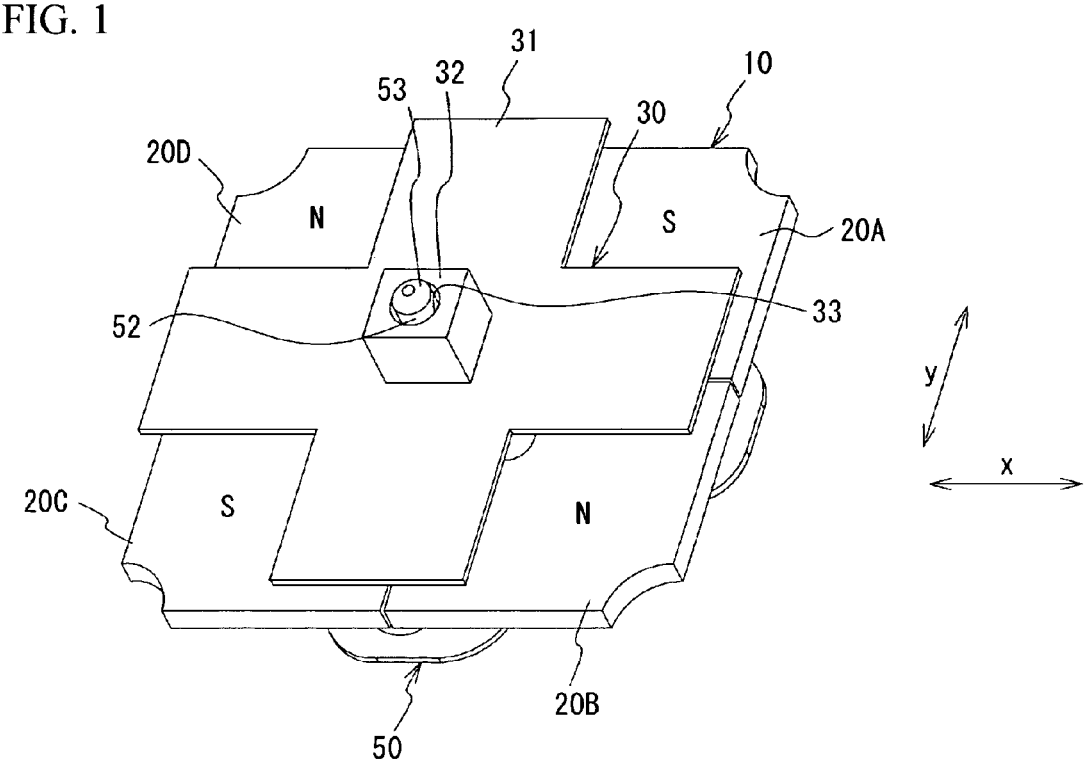
FIG. 1 is an external perspective view of an actuator in accordance with a first exemplary embodiment of the present invention.
Figure 2:
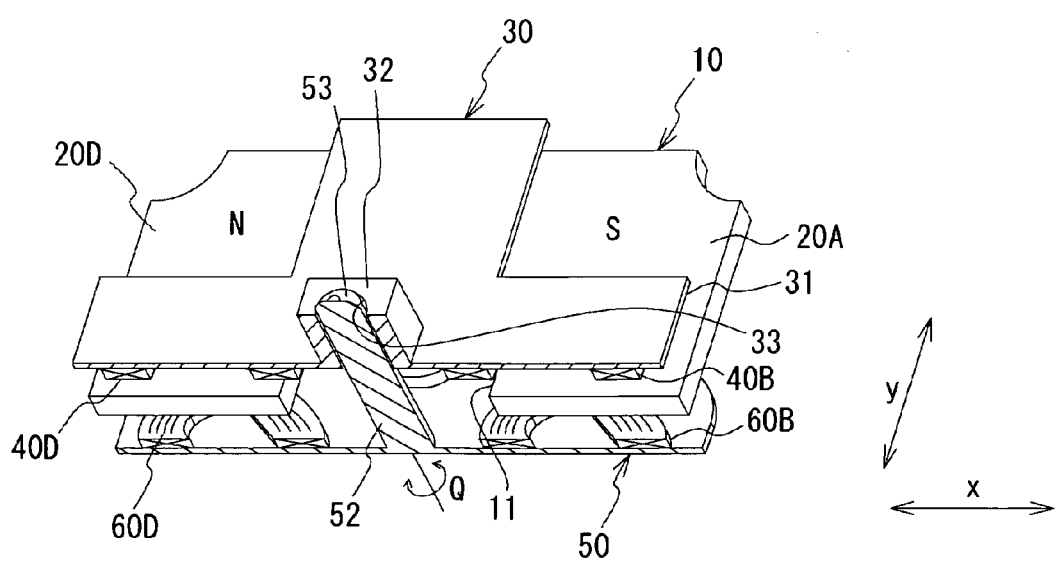
FIG. 2 is a cross-sectional perspective view of the actuator in accordance with the first exemplary embodiment of the present invention.
Figure 3:
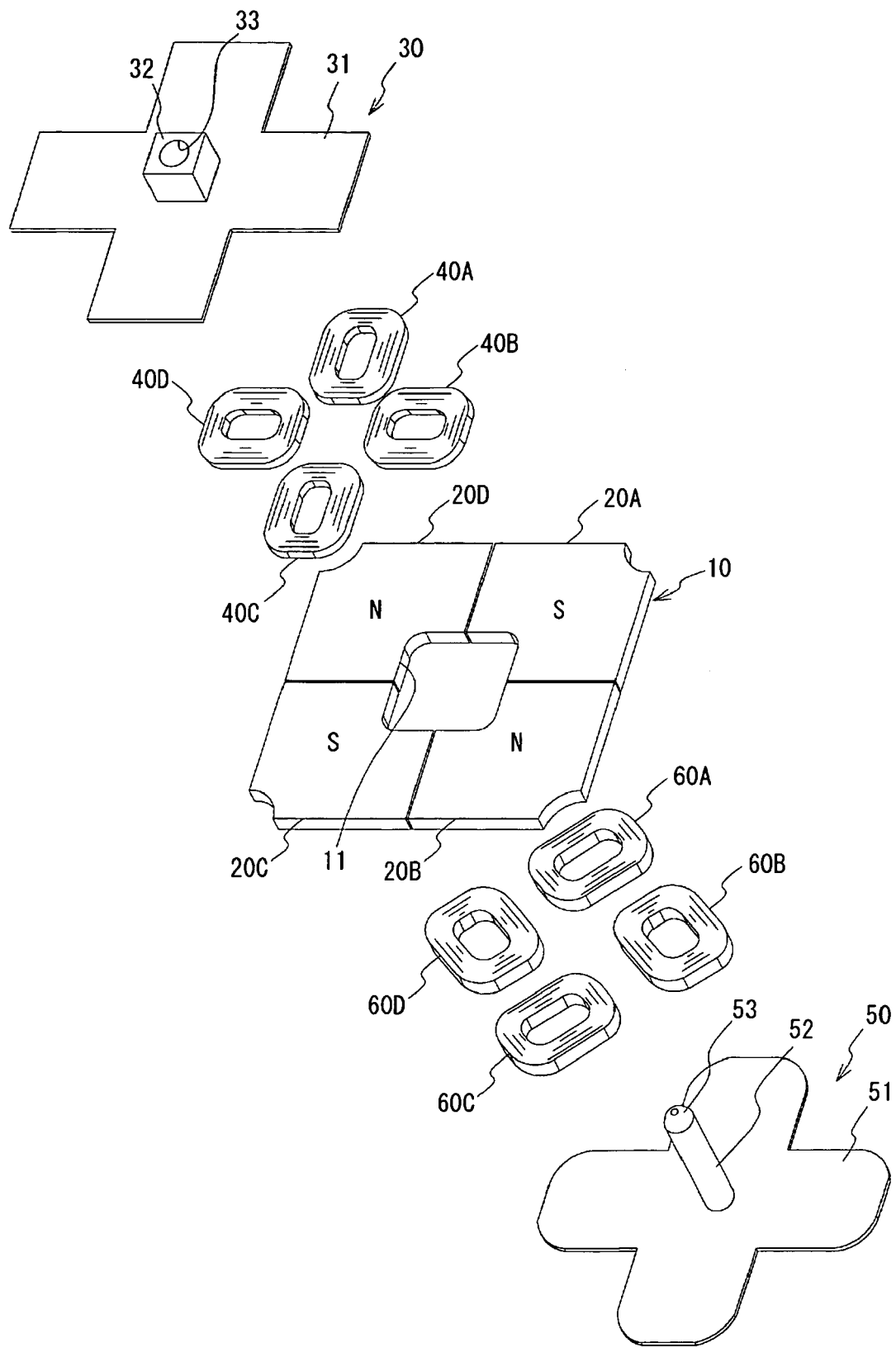
FIG. 3 is an exploded perspective view of the actuator in accordance with the first exemplary embodiment of the present invention.
Figure 4:
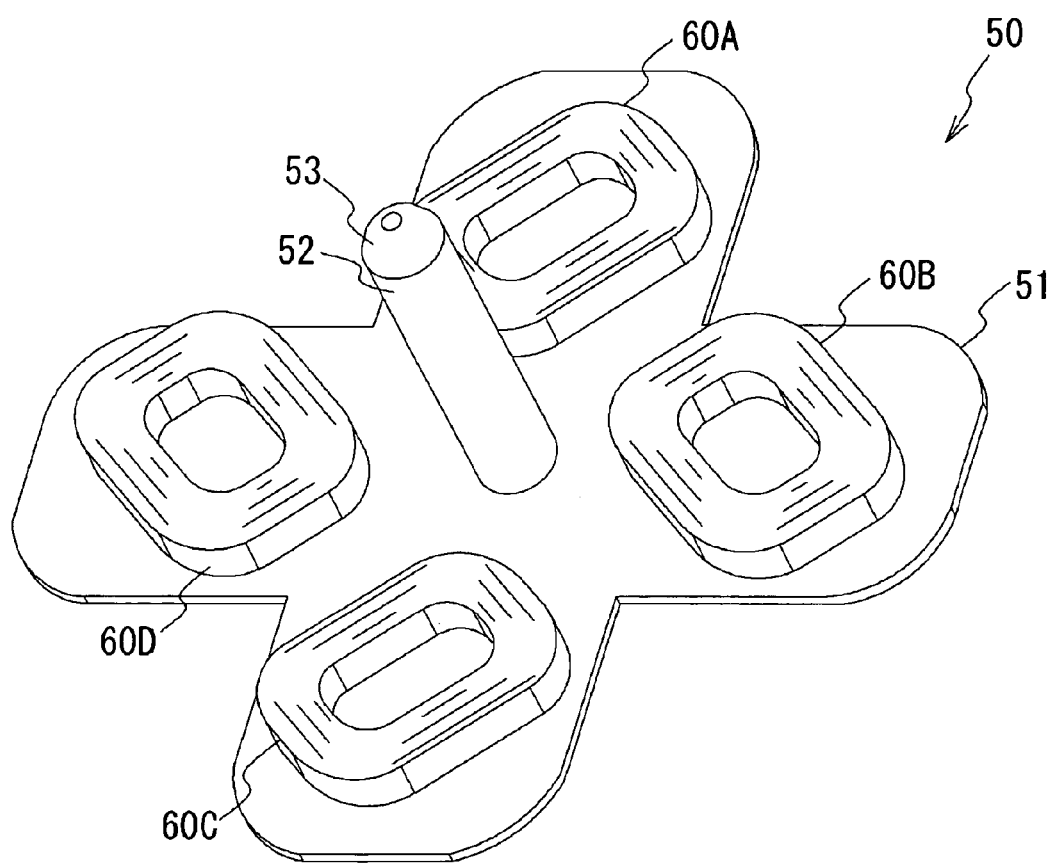
FIG. 4 is a perspective view of a rotationally movable element in accordance with the first exemplary embodiment of the present invention.
Figure 5:
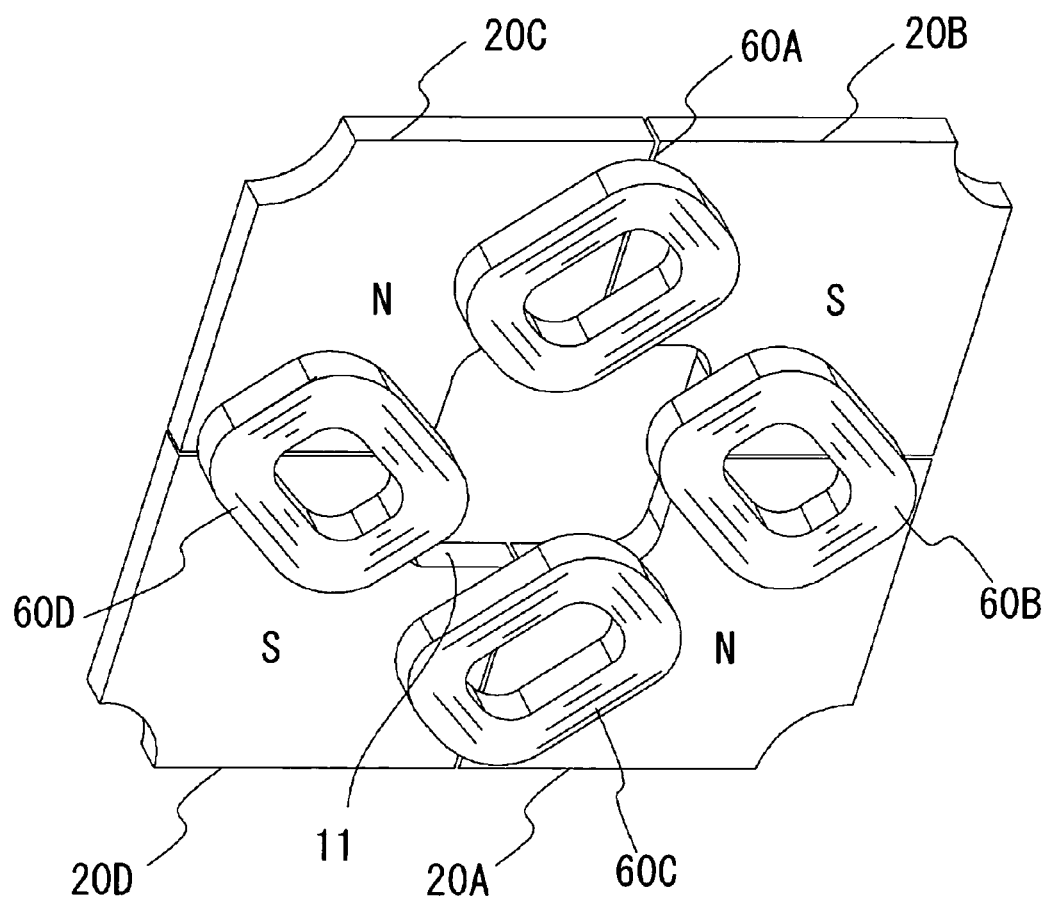
FIG. 5 is a perspective view showing the relationship between a stator and coils of the rotationally movable element in accordance with the first exemplary embodiment of the present invention.

FIG. 1 through FIG. 5 are views illustrating an actuator that provides tactile information (hereinafter, simply referred to as actuator) in accordance with a first exemplary embodiment of the present invention. FIG. 1 is an external perspective view of the actuator. FIG. 2 is a cross-sectional perspective view of the actuator. FIG. 3 is an exploded perspective view of the actuator. FIG. 4 is a perspective view of a rotationally movable element. FIG. 5 is a perspective view showing the relationship between a stator and coils of the rotationally movable element. Referring to FIG. 1 through FIG. 3, the actuator includes: a stator 10; a translationally movable element 30; a rotationally movable element 50, and the like. An example of use of the actuator is that the actuator is built in an electronics device such as a mouse or the like that serves as a pointing device of a computer. The stator 10 is retained by the device in which the actuator is built. The translationally movable element 30 and the rotationally movable element 50 are, for example, built in a guide mechanism disclosed in Japanese Patent Application Publication No. 2004-145748, or build in a device in the state of being retained movably in x-axis direction (first direction) and in y-axis direction (second direction) crossed at right angles to each other by an elastic material or the like, which is disclosed in Japanese Patent Application Publication No. 2000-330688.

As shown in FIG. 1 through FIG. 3, the stator 10 is composed of four permanent magnets 20A through 20D of a plane shape, and is formed to have a shape of plane plate with end faces of the four permanent magnets 20A through 20D firmly fixed respectively. The stator 10 has an opening 11, which substantially has a rectangular shape. The permanent magnets 20A through 20D are magnetized in a thickness direction thereof, and are located in such a manner that firmly fixed adjacent permanent magnets 20 have different polarities from each other.

The translationally movable element 30 includes: coils 40A through 40D provided to respectively correspond to the four permanent magnets 20A through 20D; and a first retaining member 31 of a plane plate that retains the coils 40A through 40D commonly. The translationally movable element 30 is disposed to oppose one of main surfaces of the stator 10. The coils 40A through 40D are flattened to be long and thin, are disposed symmetrically with respect to boundaries of the permanent magnets 20A through 20D firmly fixed to each other, and are disposed to respectively oppose two adjacent permanent magnets 20. The coil 40A and the coil 40C are provided to move the translationally movable element 30 in x-axis direction, and the coil 40B and the coil 40D are provided to move the translationally movable element 30 in y-axis direction.

The first retaining member 31 retains the coils 40A through 40D at an opposing surface that opposes the stator 10, and is provided with a connecting portion 32 formed to be protruded in the middle of the opposite surface of the afore-described opposing surface. A through-hole 33 is formed in the middle of the connecting portion 32, so that a shaft 52 of a second retaining member 51, described later, is fitted and inserted into the through-hole 33.

As shown in FIG. 1 through FIG. 3, the rotationally movable element 50 includes: coils 60A through 60D provided to respectively correspond to the four permanent magnets 20A through 20D; and the second retaining member 51 of a plane plate that commonly retains the coils 60A through 60D. The rotationally movable element 50 is arranged to oppose the other main surface of the stator 10.

The coils 60A through 60D are provided to rotate the rotationally movable element 50, are flattened to be long and thin, are disposed asymmetrically with respect to the boundaries (disposed to slant across the boundaries) of the permanent magnets 20A through 20D firmly fixed to each other, and are disposed to respectively oppose two adjacent permanent magnets 20. The coils 60A through 60D are respectively arranged on a slant with respect to the corresponding coils 40A through 40D. The reason why the coils 60A through 60D are arranged on a slant is to prevent the electromagnetic power to be exerted on the coils 60A through 60D from affecting the movement of the translationally movable element 30 in x-axis direction and in y-axis direction, as will be described later.

Referring now to FIG. 4, the second retaining member 51 retains the coils 60A through 60D on the opposing surface that opposes the stator 10, and is provided with the shaft 52 formed to be protruded in the middle of the afore-described opposing surface. The shaft 52 is inserted into the opening 11 of the stator 10 and fitted and inserted into the through-hole 33 of the connecting portion 32 at the first retaining member 31, so a tip 53 thereof projects from an upper surface of the connecting portion 32. Since the shaft 52 is fitted and inserted into the through-hole 33, the translationally movable element 30 and the rotationally movable element 50 interlock in x-axis direction and in y-axis direction. When a rotational force is exerted on the rotationally movable element 50, only the rotationally movable element 50 rotates around the shaft 52 serving as a given axis.

Figure 6:
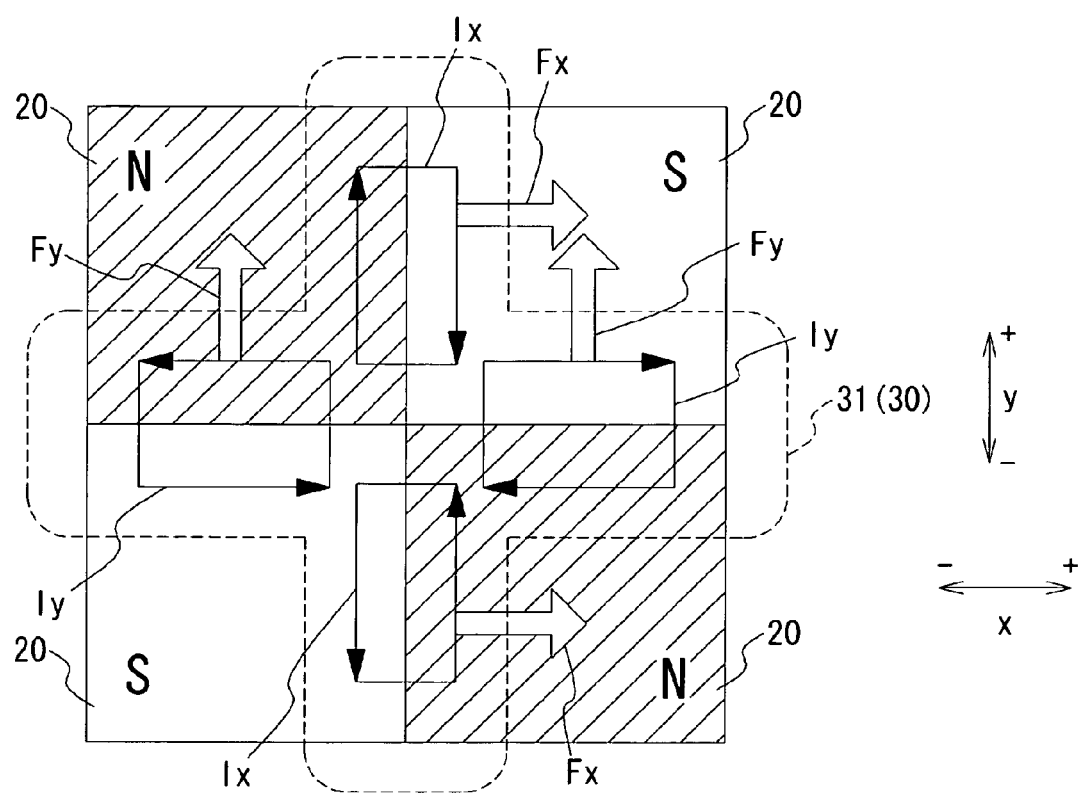
FIG. 6 is a view illustrating a method of flowing current in a translationally movable element in accordance with the first exemplary embodiment of the present invention.
Figure 7:
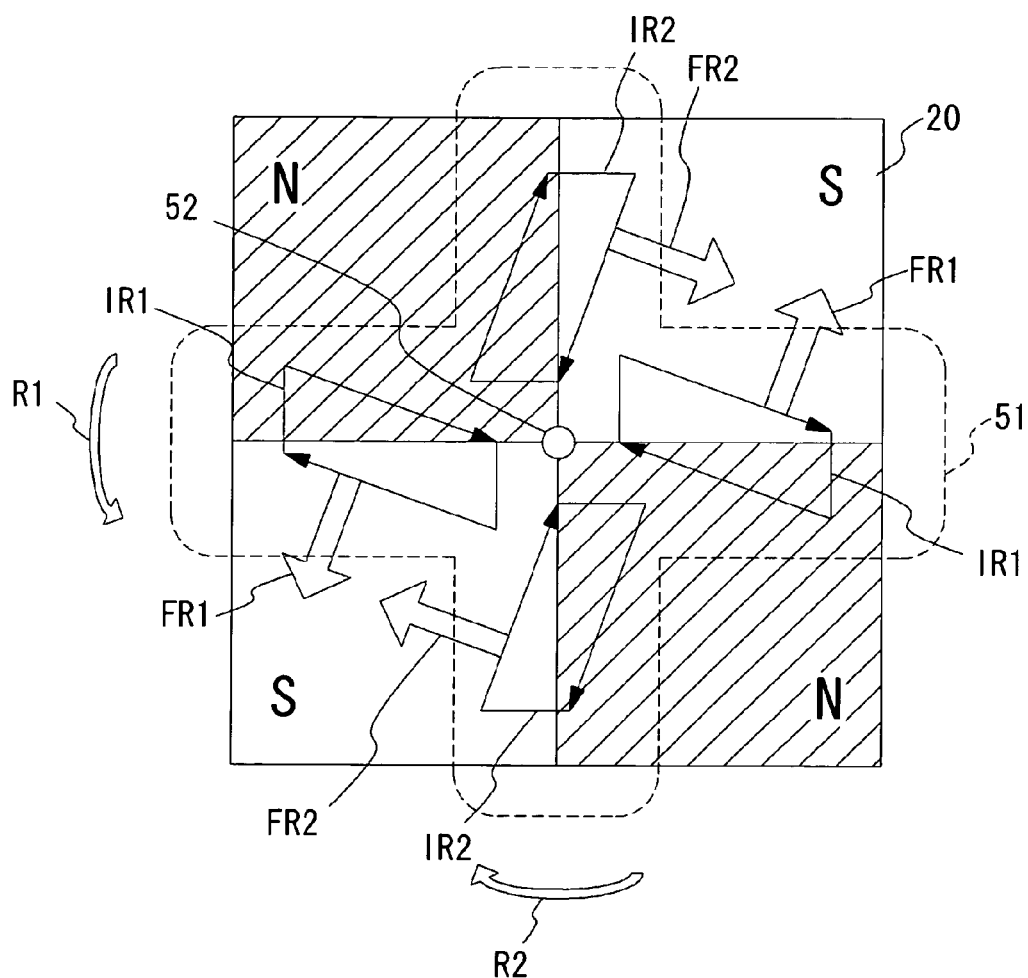
FIG. 7 is a view illustrating a method of flowing current in a rotationally movable element in accordance with the first exemplary embodiment of the present invention.
Figure 8:
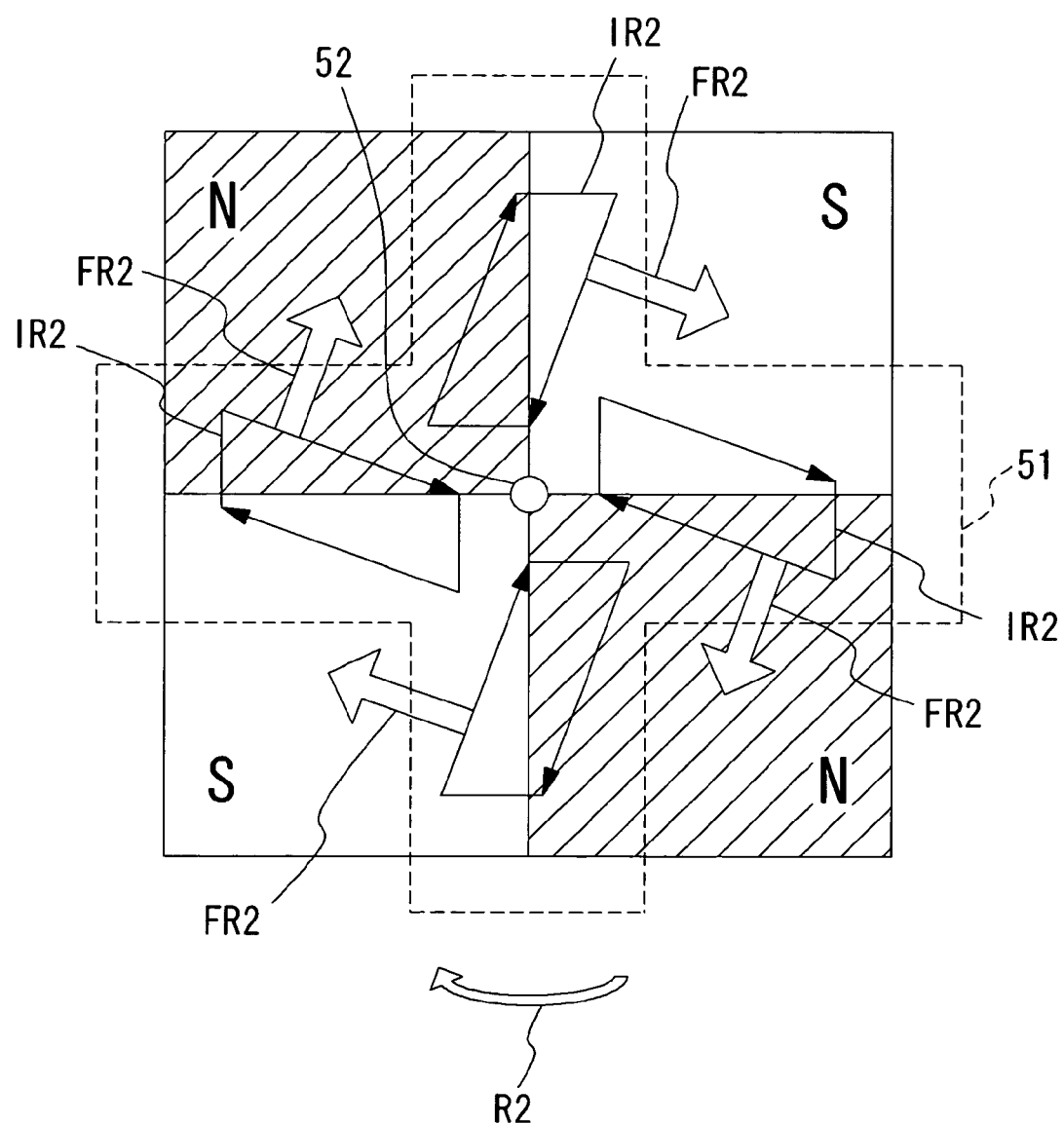
FIG. 8 is a view illustrating another method of flowing current in the rotationally movable element in accordance with the first exemplary embodiment of the present invention.

A description will now be given of a driving method of the actuator, with reference to FIG. 6 through FIG. 8. Here, FIG. 6 is a view illustrating a method of flowing current in the translationally movable element 30. FIG. 7 is a view illustrating a method of flowing current in the rotationally movable element 50. FIG. 8 is a view illustrating another method of flowing current in the rotationally movable element 50. To move the translationally movable element 30 in x-axis direction, a current Ix is applied to the coil 40A and the coil 40C provided for x-axis movement, as shown in FIG. 6. This exerts an electromagnetic power Fx on the translationally movable element 30 in + direction of x-axis along the main surfaces of the stator 10, in accordance with Fleming's left-hand rule, and the translationally movable element 30 and the rotationally movable element 50 move translationally in + direction of x-axis. To move the translationally movable element 30 and the rotationally movable element 50 in – direction of x-axis, it is only necessary to reverse the current-flowing direction of the current Ix. Therefore, when the alternating current Ix of a given frequency is applied to the coil 40A and the coil 40C, the translationally movable element 30 and the rotationally movable element 50 can be vibrated at a given frequency in x-axis direction.

To move the translationally movable element 30 in y-axis direction, a current Iy is applied to the coil 40B and the coil 40D provided for y-axis movement, as shown in FIG. 6. This exerts an electromagnetic power Fy on the translationally movable element 30 in + direction of y-axis in accordance with Fleming's left-hand rule, and the translationally movable element 30 and the rotationally movable element 50 move translationally in + direction of y-axis. To move the translationally movable element 30 and the rotationally movable element 50 in – direction of y-axis, it is only necessary to reverse the current-flowing direction of the current Iy. Therefore, when the alternating current Iy of a given frequency is applied to the coil 40B and the coil 40D, the translationally movable element 30 and the rotationally movable element 50 can be vibrated at a given frequency in y-axis direction. Also, the movable range of the translationally movable element 30 is defined by the width of each coil.

Referring now to FIG. 7, to rotate the rotationally movable element 50, a current IR1 is applied to a pair of opposing coils 60 (an example is the coil 60B and the coil 60D). This exerts an electromagnetic power FR1 on the rotationally movable element 50 in accordance with Fleming's left-hand rule, and the electromagnetic power FR1 serves as a moment that rotates the second retaining member 51 around the shaft 52 in a rotation direction R1. This results in a separate rotation of the rotationally movable element 50 from the translationally movable element 30. To rotate the rotationally movable element 50 in a rotation direction R2, as shown in FIG. 7, it is only necessary to apply a current IR2 to the coil 60A and the coil 60C. Therefore, when current applied to is periodically switched between the coil 60B and the coil 60D, and the coil 60A and the coil 60C, the rotationally movable element 50 can be vibrated in the rotation directions R1 and R2.

Also, to increase the moment to be exerted on the rotationally movable element 50, for example, the current IR2 is applied to all the coils 60A through 60D, as shown in FIG. 8. This can increase the moment of the rotation direction R2 exerted on the rotationally movable element 50 more than the moment shown in FIG. 7. To increase the moment to be exerted on the rotationally movable element 50 in the rotation direction R1, it is only necessary to reverse the current-flowing direction of the current IR2.

When the actuator is driven in the method described heretofore and the operator operates the device in which the actuator is built, the tactile information is provided to the operator through the connecting portion 32 and the tip 53 in accordance with the translational movement and the rotational movement, in response to the operator's touch of the connecting portion 32 and the tip 53 of the shaft 52.

Second Exemplary Embodiment

Figure 9:
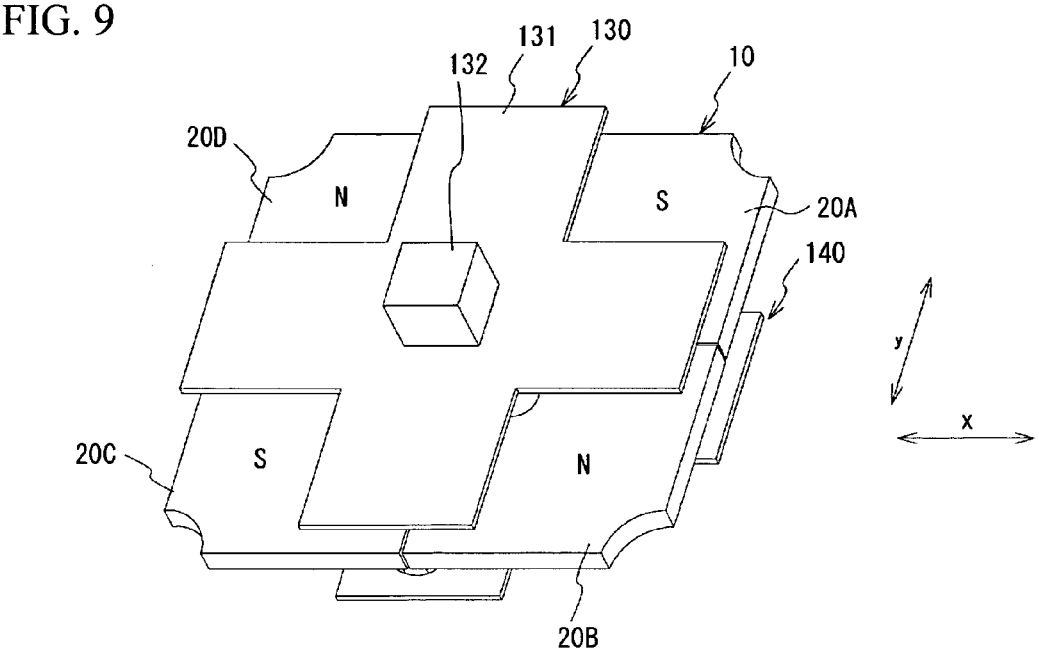
FIG. 9 is an external perspective view of the actuator in accordance with a second exemplary embodiment of the present invention.
Figure 10:
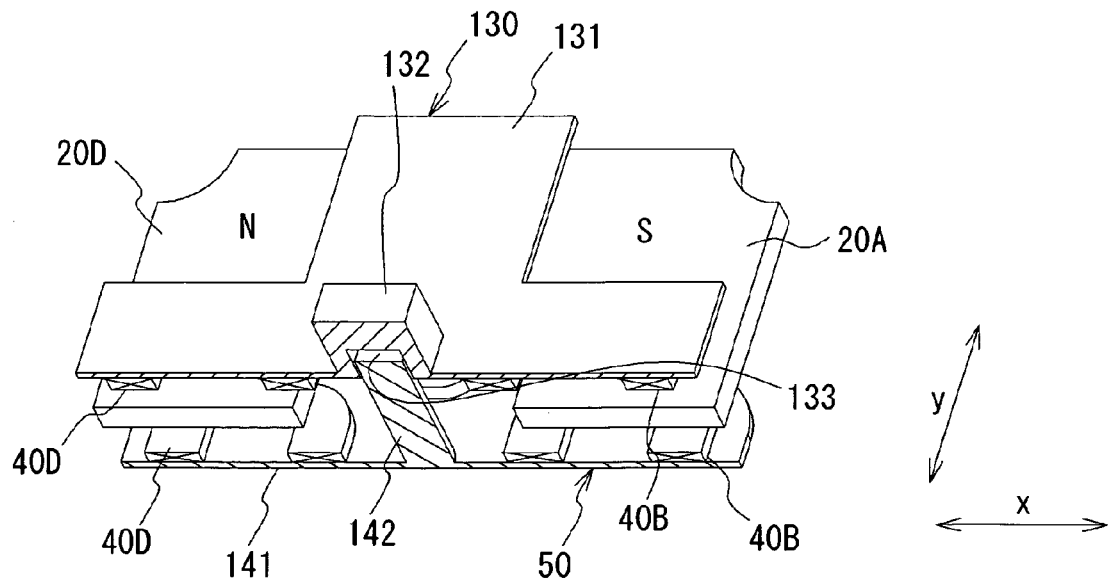
FIG. 10 is a cross-sectional perspective view of the actuator in accordance with the second exemplary embodiment of the present invention.
Figure 11:
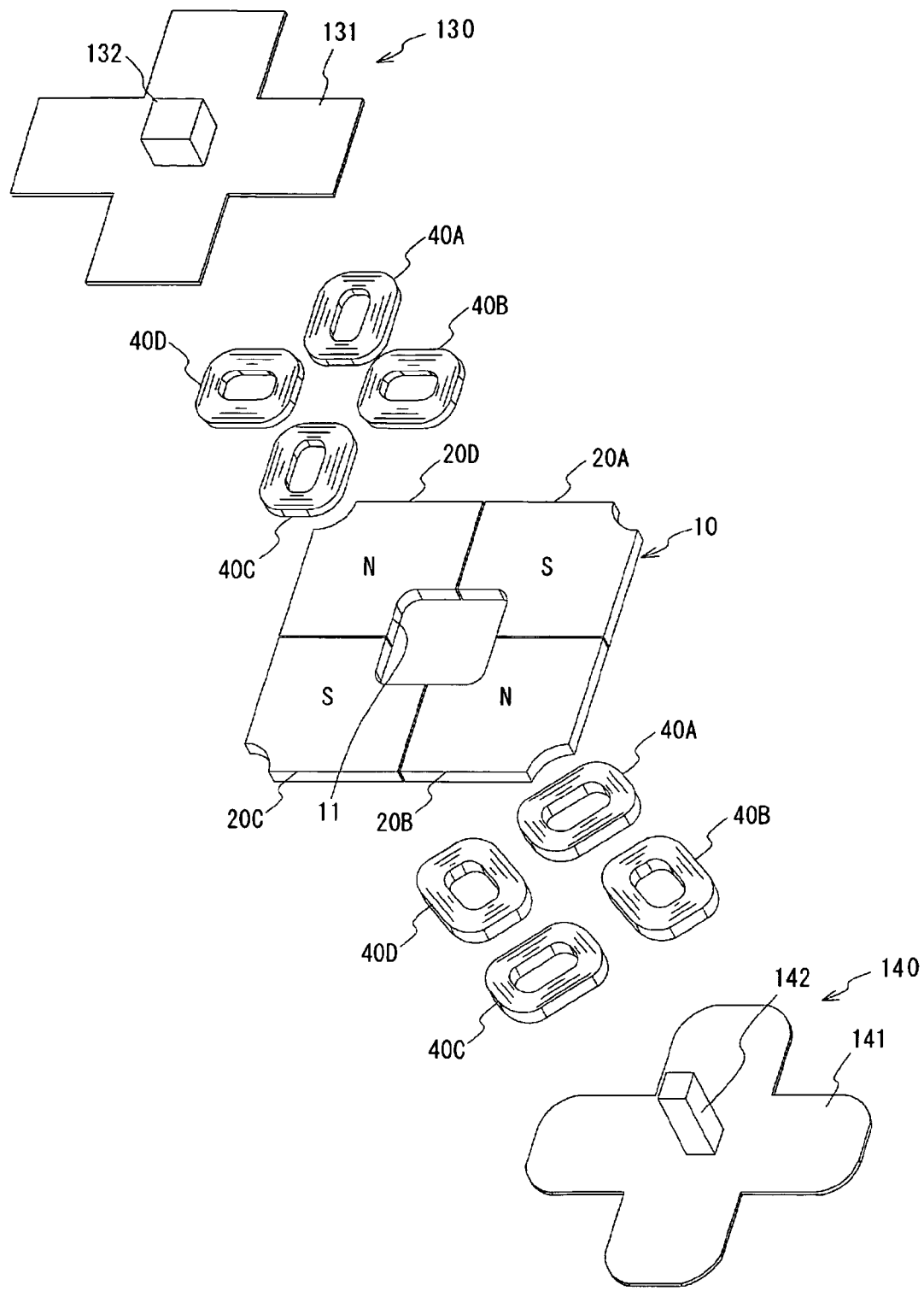
FIG. 11 is an exploded perspective view of the actuator in accordance with the second exemplary embodiment of the present invention.

FIG. 9 through FIG. 11 are views illustrating an actuator that provides tactile information in accordance with a second exemplary embodiment of the present invention. FIG. 9 is an external perspective view of the actuator. FIG. 10 is a cross-sectional perspective view of the actuator. FIG. 11 is an exploded perspective view of the actuator. Hereinafter, in FIG. 9 through FIG. 11, the same components and configurations as those of the first exemplary embodiment have the same reference numerals.

The actuator employed in the present exemplary embodiment includes: the stator 10 formed in a plane plate; movable elements 130 and 140 provided to sandwich the stator 10 and move in response to the electromagnetic power exerted between movable elements 130 and 140 and the stator 10 in x-axis direction and in y-axis direction crossed at right angles to each other along the main surfaces; and the like.

The stator 10 is provided with a first retaining member 131 and a second retaining member 141 respectively disposed at both sides of the stator 10 to oppose each other. The first retaining member 131 and the second retaining member 141 retain the coil 40A through the coil 40D at almost same positions on opposing surfaces that oppose the stator 10. The first retaining member 131 is provided with a connecting portion 132 formed to be protruded in the middle of the opposite surface of the afore-described opposing surface. The connecting portion 132 has a connecting blind hole 133 having an angular cross-section, as shown in FIG. 10. The second retaining member 141 is provided with, as shown in FIG. 10 and FIG. 11, a connecting shaft 142 having an angular cross-section formed to be protruded in the middle of the opposing surface that opposes the stator 10. The first retaining member 131 and the second retaining member 141 are connected by fitting and inserting the connecting shaft 142 into the connecting blind hole 133 of the retaining member 131. This allows the movable elements 130 and 140 to integrally move in x-axis direction and in y-axis direction.

According to the present exemplary embodiment of the present invention, the actuator is configured in such a manner that the coils 40A through 40D are respectively disposed to oppose each other and are commonly retained on the both main surfaces of the stator 10 composed of the permanent magnets 20A through 20D. Accordingly, the magnetic flux of the permanent magnets 20A through 20D is efficiently available, thereby making the thrust force of the movable elements 130 and 140 greater. That is to say, the thrust force of the movable elements 130 and 140 can be made greater, without increasing the value of current flowing across the coils 40A through 40D, than the case where the coils 40A through 40D are arranged only on one of the main surfaces, thereby suppressing the heat developed on the actuator.

In the above-described exemplary embodiments, a description has been given of the case where the stator is composed of the permanent magnets. However, the present invention is not limited thereto. The stator may be composed of an electric magnet.

In the above-described exemplary embodiments, a description has been given of the case where the stator is composed of permanent magnets and the movable elements include the coils. However, the present invention is not limited thereto. The stator may be composed of a coil and the movable element may include a permanent magnet.

In the above-described exemplary embodiments, a description has been given of the actuator in which the translationally movable element and rotational movable element are coupled. However, the present invention is not limited thereto. The translationally movable element and rotational movable element may be configured to be movable independently of each other.

Finally, various aspects of the present invention are summarized in the following.

According to a first aspect of the present invention, there is provided an actuator that provides tactile information include: a stator formed in a plane plate; a translationally movable element disposed to oppose each other on one of main surfaces of the stator to move translationally in response to an electromagnetic power exerted between the movable elements and the stator in a first direction and in a second direction crossed at right angles to each other along the main surfaces; and a rotationally movable element disposed to oppose each other on the other main surface of the stator to move rotationally in response to the electromagnetic power exerted between the movable elements and the stator.

In the above-described actuator, the translationally movable element and the rotationally movable element may be connected to be relatively rotatable around a given axis. With the above-described configuration, the translationally movable element and the rotationally moveable element interlock at the time of the translational movement, and only the rotationally movable element can be moved at the time of the rotational movement.

In the above-described actuator, the stator may include multiple permanent magnets formed in a plane shape and disposed on the main surfaces; and the translationally movable element and the rotationally movable element respectively may include multiple coils and respectively include a first retaining member and a second retaining member that retain the multiple coils commonly. With the above-described configuration, the movable elements are provided with relatively lightweight coils, thereby driving the movable elements with ease and reducing the number of the permanent magnets, which are relatively heavy in weight and high in costs. This enables. the reduced cost and reduced weight of the actuator.

In the above-described actuator, the stator may have an opening in the middle thereof; the second retaining member may include a shaft to be inserted into the opening; and the first retaining member may include a connecting portion having a through-hole into which the shaft is rotationally fitted and inserted. With the above-described configuration, the shaft is fitted and inserted into the through-hole of the connecting portion, and the translationally movable element and the rotationally moveable element can interlock at the time of the translational movement, and only the rotationally movable element can be moved at the time of the rotational movement.

In the above-described actuator, each of the coils included in the translationally movable element may be arranged on a slant with respect to a corresponding coil included in the rotationally movable element. With the above-described configuration, the relative positions of the coils for rotationally movable element and those for the translationally movable elements are on a slant. This makes it possible to prevent the force exerted on the rotationally movable element from affecting the movement of the translationally movable element, in the case where the rotationally movable element and the translationally movable element are rotationally connected.

According to a second aspect of the present invention, there is provided an actuator that provides tactile information including: a stator formed in a plane plate; and movable elements disposed to sandwich the stator to move in response to the electromagnetic power exerted in a first direction and in a second direction crossed at right angles to each other along main surfaces of the stator.

In the above-described actuator, the stator may include multiple permanent magnets formed in a plane shape and disposed on the main surfaces; and each of the movable elements may include multiple coils and a retaining member that retains the multiple coils commonly on a main surface thereof. With the above-described configuration, the shaft is fitted and inserted into the through-hole of the connecting portion, and the translationally movable element and the rotationally moveable element can interlock at the time of the translational movement, and only the rotationally movable element can be moved at the time of the rotational movement.

The present invention is not limited to the above-mentioned exemplary embodiments, and other embodiments, variations and modifications may be made without departing from the scope of the present invention.

The present invention is based on Japanese Patent Application No. 2005-226849 filed on Aug. 4, 2005, the entire disclosure of which is hereby incorporated by reference.

What is claimed is:

1. An actuator that provides tactile information comprising:
   a stator formed in a plane plate;
   a translationally movable element disposed to oppose one of a plurality of main surfaces of the stator to move translationally in response to an electromagnetic power exerted between the translationally movable element and the stator in a first direction and in a second direction crossed at right angles to each other along the main surfaces; and
   a rotationally movable element disposed to oppose the other main surface of the stator and to move rotationally in response to electromagnetic power exerted between the rotationally movable element and the stator,
   wherein the translationally movable element and the rotationally movable element are connected to be relatively rotatable around a given axis.

2. The actuator as claimed in claim 1, wherein:
   the stator includes multiple permanent magnets formed in a plane shape and disposed on the main surfaces of the stator between the translationally movable element and the rotationally movable element; and
   the translationally movable element and the rotationally movable element respectively include multiple coils and respectively include a first retaining member and a second retaining member that retain the multiple coils commonly.

3. An actuator that provides tactile information comprising:
   a stator formed in a plane plate;
   a translationally movable element disposed to oppose one of a plurality of main surfaces of the stator to move translationally in response to an electromagnetic power exerted between the translationally movable element and the stator in a first direction and in a second direction crossed at right angles to each other along the main surfaces; and
   a rotationally movable element disposed to oppose the other main surface of the stator and to move rotationally in response to electromagnetic power exerted between the rotationally movable element and the stator, wherein;
   the stator includes multiple permanent magnets formed in a plane shape and disposed on the main surfaces of the stator between the translationally movable element and the rotationally movable element;
   the translationally movable element and the rotationally movable element respectively include multiple coils and respectively include a first retaining member and a second retaining member that retain the multiple coils commonly, and wherein:
   the stator has an opening in the middle thereof;
   the second retaining member includes a shaft to be inserted into the opening; and
   the first retaining member includes a connecting portion having a through-hole into which the shaft is rotationally fitted and inserted.

4. The actuator as claimed in claim 3, wherein the tactile information is provided to a user of the actuator through the connecting portion.

5. An actuator that provides tactile information comprising:
   a stator formed in a plane plate;
   a translationally movable element disposed to oppose one of a plurality of main surfaces of the stator to move translationally in response to an electromagnetic power exerted between the translationally movable element and the stator in a first direction and in a second direction crossed at right angles to each other along the main surfaces; and
   a rotationally movable element disposed to oppose the other main surface of the stator and to move rotationally in response to electromagnetic power exerted between the rotationally movable element and the stator, wherein:
   the stator includes multiple permanent magnets formed in a plane shape and disposed on the main surfaces of the stator between the translationally movable element and the rotationally movable element, the translationally movable element and the rotationally movable element respectively include multiple coils and respectively include a first retaining member and a second retaining member that retain the multiple coils commonly, and wherein each of the coils included in the translationally movable element is arranged on a slant with respect to a corresponding coil included in the rotationally movable element.

* * * * *

UNITED STATES PATENT AND TRADEMARK OFFICE
CERTIFICATE OF CORRECTION

PATENT NO. : 7,495,656 B2 Page 1 of 1
APPLICATION NO. : 11/498040
DATED : February 24, 2009
INVENTOR(S) : Takashi Yuba et al.

It is certified that error appears in the above-identified patent and that said Letters Patent is hereby corrected as shown below:

Column 8, Line 32 Claim 3, change "wherein;" to --wherein:--.

Signed and Sealed this

Twelfth Day of May, 2009

JOHN DOLL
*Acting Director of the United States Patent and Trademark Office*